US006051324A

United States Patent [19]

Moorhead et al.

[11] Patent Number: 6,051,324

[45] Date of Patent: Apr. 18, 2000

[54] COMPOSITE OF CERAMIC-COATED MAGNETIC ALLOY PARTICLES

[75] Inventors: Arthur J. Moorhead, Knoxville, Tenn.; Hyoun-Ee Kim, Seoul, Rep. of Korea

[73] Assignee: Lockheed Martin Energy Research Corporation, Oak Ridge, Tenn.

[21] Appl. No.: 08/929,412

[22] Filed: Sep. 15, 1997

[51] Int. Cl.[7] .......... B32B 5/16

[52] U.S. Cl. .......... 428/552; 428/570; 428/403; 428/404

[58] Field of Search .......... 428/323, 325, 428/328, 329, 331, 403, 404, 552, 570

[56] References Cited

U.S. PATENT DOCUMENTS

| | | | |
|---|---|---|---|
| 3,655,425 | 4/1972 | Longo et al. | 75/230 |
| 4,617,055 | 10/1986 | Miura et al. | 75/251 |
| 5,063,011 | 11/1991 | Rutz et al. | 264/126 |
| 5,164,104 | 11/1992 | Kobayashi et al. | 252/62.57 |
| 5,198,137 | 3/1993 | Rutz et al. | 252/62.54 |
| 5,268,140 | 12/1993 | Rutz et al. | 419/54 |
| 5,300,317 | 4/1994 | Ivarson | 427/195 |
| 5,350,628 | 9/1994 | Kugimiya et al. | 428/307.3 |
| 5,352,522 | 10/1994 | Kugimiya et al. | 428/403 |
| 5,399,432 | 3/1995 | Schleifstein et al. | 428/403 |
| 5,652,054 | 7/1997 | Kikitsu et al. | 428/328 |
| 5,679,297 | 10/1997 | Hwang | 264/82 |
| 5,798,439 | 8/1998 | Lefebvre et al. | 528/489 |
| 5,842,107 | 11/1998 | Wu et al. | 419/13 |

OTHER PUBLICATIONS

"Sintering Theory and Practice", Randall M. German, pp. 350, 353, 355, 366, (1996).

"Engineered Materials Handbook", vol. 4, Ceramics and Glasses, pp. 495–497, 499, (1991).

*Primary Examiner*—Hoa T. Le

*Attorney, Agent, or Firm*—Quarles & Brady LLP

[57] ABSTRACT

A composite structure and method for manufacturing same, the composite structure being comprised of metal particles and an inorganic bonding media. The method comprises the steps of coating particles of a metal powder with a thin layer of an inorganic bonding media selected from the group of powders consisting of a ceramic, glass, and glass-ceramic. The particles are assembled in a cavity and heat, with or without the addition of pressure, is thereafter applied to the particles until the layer of inorganic bonding media forms a strong bond with the particles and with the layer of inorganic bonding media on adjacent particles. The resulting composite structure is strong and remains cohesive at high temperatures.

4 Claims, 5 Drawing Sheets

COMPOSITE OF CERAMIC-COATED MAGNETIC ALLOY PARTICLES

STATEMENT REGARDING FEDERALLY SPONSORED RESEARCH OR DEVELOPMENT

This invention was made with government support under contract DE-AC05-960R22464, awarded by the United States Department of Energy to Lockheed Martin Energy Research Corporation, and the United States Government has certain rights in this invention.

CROSS REFERENCE TO RELATED APPLICATIONS (Not Applicable)

BACKGROUND OF THE INVENTION

1. Technical Field

This invention relates to metal-ceramic composite materials, and more particularly to metal powder particles which, after being coated with a thin layer of ceramic, glass, or glass-ceramic bonding media insulation are densified by application of heat, with or without pressure.

2. Description of the Related Art

The cores of motors, generators, and transformers are generally comprised of a large number of thin metal laminations that are separated from one another by a layer of insulating material. In the highest performance magnetic cores the metal laminations are comprised of one of two iron-cobalt alloys (Fe-49Co-2V or Fe-27Co-0.6Cr). The interlaminar insulation, which may consist of an oxide layer on the metal plus an organic adhesive layer between laminations, is necessary to insure high electrical efficiency in the magnetic core. The most demanding applications for these core assemblies are those used in airborne power generators. Airborne power generation requires compact, high-output equipment and thus a lamination material with the highest saturation induction and lowest hysteresis losses, i.e., an iron-cobalt alloy. The high rotational speeds in these devices, on the order of 12,000 rpm, imposes significant mechanical stresses on the rotor material as well as the adhesive that bonds the laminates. In fact, the yield strength of the magnetic rotor material may be the decisive factor in alloy selection for this application, and it is highly desirable that the strength of the adhesive bond be comparable with that of the magnetic material.

There are presently under development two new demanding applications for magnetic materials—compact, very high speed electrical generators, and high-temperature magnetic bearings. The proposed generators spin at speeds on the order of 100,000 rpm, resulting in high stresses on the foil laminates and the adhesives joining them.

The high-temperature magnetic bearings are being considered for future gas turbine engines. Magnetic bearings could increase the reliability and reduce the weight of these engines by eliminating the lubrication system. They could also increase the DN (diameter of the bearing times rpm) limit on engine speed, and allow active vibration cancellation systems to be use—resulting in a more efficient, "more electric" engine. The magnetic bearing is similar to an electric motor. It has a laminated rotor and stator, likely made of an iron-cobalt alloy. Wound around the stator are a series of electrical wire coils that form a series of electric magnets around the circumference. The magnets exert a force on the rotor. A probe senses the position of the rotor, and a feedback controller keeps it in the center of the cavity.

For gas turbine applications, it is desirable that the magnetic bearings be capable of operating at temperatures on the order of 650° C.

The strength of magnetic rotor assemblies can be enhanced by the addition of metal pins or stakes that are inserted into holes punched in the laminations. However, there is a penalty in electrical efficiency for the use of such devices since the lamination factor (solidity of the core) is reduced when the magnetic lamination material is replaced by a non-magnetic material.

Magnetic core material can also be made from metal powder instead of foil. This approach has several advantages over the more traditional foil lamination technique: (1) the material will be more isotropic in magnetic and mechanical properties than a laminated product, (2) the size of the core is not limited, as is a laminated core in "pancake" geometry, by the available width of magnetic alloy foil, and (3) the core can be fabricated from an alloy (such as Fe-6Si) that is too brittle to roll into foil. However, for AC applications the metal particles must still be electrically isolated from one another in order to minimize eddy current losses.

At least one such powder metallurgy product is presently commercially available from the Hoeganaes Corporation of Riverton, N.J. See also U.S. Pat. Nos. 5,063,011, 5,198,137, 5,268,140 and 5,300,317. This material is comprised of thermoplastic-coated iron particles that are formed into a structure through application of very high pressures at warm temperatures, such as 50 tons/in$^2$ and 260° C., respectively. The thermoplastic coating serves as the electrical insulation between particles (as required for AC applications) as well as the bonding agent. The surface of the iron particles may also be pretreated, such as with a phosphate coating, as an added insulating material.

However, organic materials (whether in the form of an organic adhesive used to bond metal foil laminations, or a polymer coating used to insulate and bond metal powder particles) lose much of their strength at relatively modest temperatures. For example, according to the chapter "Adhesives Selection" by John Williams in the *ASM Engineered Materials Handbook,* Volume 1, Composites, p. 684, (1987), the maximum use temperatures for organic adhesives range from only 82° C. for epoxies to 260° C. for some polyimides. Thus, the strength of organic-bonded magnetic structures can be expected to be severely degraded by temperatures as low as 100° C. to 200° C.

Thus, there is a need for a method to strongly bond together magnetic alloy particles to form the cores of high performance electromagnetic equipment. The method would replace conventional foil laminate structures comprised of metal foils bonded by organic adhesives, as well as the newer powder metallurgy products in which a thermoplastic (or other organic material) is used to electrically isolate and bond together magnetic alloy particles.

SUMMARY OF THE INVENTION

The invention consists of a composite structure and methods for manufacturing same. The composite structure is comprised of metal powder particles, each of which are surrounded by an inorganic bonding media selected from at least one of the group of powders consisting of ceramic, glass, or glass-ceramic. The method of this invention consists of coating metal alloy particles with a thin layer of an inorganic bonding agent comprised of a ceramic, glass, or glass-ceramic (or a mixture of two or more of the three materials) and applying heat, with or without the addition of pressure, until the inorganic agent forms a strong bond with the metal particles and the entire body is densified into a strong composite structure. The surface of the metal particles may have been previously treated by a process, such as oxidation, to enhance the degree of their being wetted, if a glass or glass-ceramic is used, or to increase the strength of the bond formed between the particles and inorganic bonding agent, whether it be ceramic, glass, or glass-ceramic.

The mass of inorganic-coated metal particles may be densified and bonded into a composite structure through the application of temperature alone, or through application of both temperature and pressure. In pressure-less sintering, densification occurs without an effective stress other than that generated by surface energy sources. Pressure-assisted sintering techniques employ combinations of temperature and stress to speed up the densification process, and to ensure the elimination of residual pores. The simultaneous heating and pressurization events add cost and complexity, but these may be justified by increased performance that comes from a higher final density.

In one embodiment, the coated particles are densified through a pressure-assisted technique which uses a uniaxial hot pressing process in a rigid, closed die comprised of a material such as graphite. In an alternate embodiment, high-pressure gas is used to transfer heat and pressure through a flexible die to bring about densification and bonding of the composite structure. The latter process is widely known as hot isostatic pressing. The method of this invention finds particular application in the manufacture of high-performance magnets, wherein the metal powder is a magnetic alloy.

The time, temperature, and pressure parameters for any of the fabrication processes are selected on the basis of the values required to achieve densification and bonding of the inorganic coating material and metal particles. Thus, it will be obvious to those skilled in the art, that the processing parameters will vary according to such factors as: the size and shape of the body being fabricated, the specific compositions of the coating material and metal particles, and other factors such as furnace design and load.

It is, therefore, an object of this invention to provide a method for bonding magnetic alloy particles into a strong, dimensionally-stable composite structure.

It is another object of the invention to bond magnetic alloy particles with an electrically-insulating agent that does not contain organic materials.

It is a further object of the invention to provide a composite article of metallic magnetic powder particles interspersed with an inorganic material, the latter of which is comprised of ceramic, glass, glass-ceramic, or mixture of two or more of the three materials.

It is also an object of the invention to provide a method for bonding non-magnetic alloy particles into a strong, dimensionally-stable composite structure.

It is a further object of the invention to bond non-magnetic alloy particles into a composite structure with a bonding agent that does not contain organic materials.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

Figure 1:
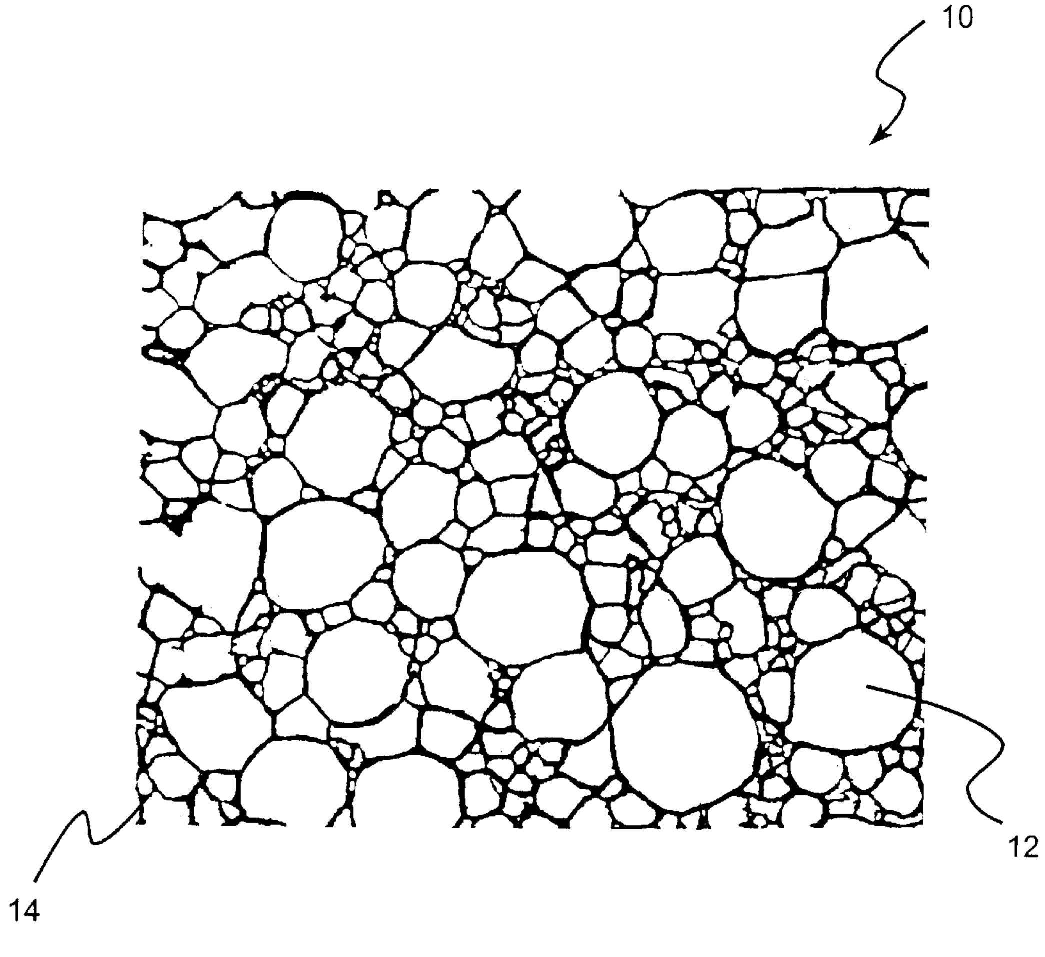
FIG. 1 is a cross-sectional view of a composite formed in accordance with the invention.

FIG. 1 illustrates a metal alloy particle composite structure manufactured in accordance with the present invention. As shown therein, the composite structure 10 is comprised of metal particles 12, each having a thin outer layer of an inorganic bonding media 14. The composite material is densified under conditions of heat, with or without the addition of pressure, to form a strong cohesive structure wherein the bonding media 14 binds the metal particles 12 to each other.

The metal particles 12 are preferably comprised of a metal having high performance magnetic properties, such as high permeability, high saturation induction, low hysteresis-energy loss, and low eddy current loss in alternating flux applications. Such metals include various alloys of iron and cobalt; iron, cobalt and vanadium; or iron, cobalt and chromium. For example, 49Fe-49Co-2V powder (domestically produced as Hiperco® 50A by Carpenter Technology Corporation) has been found to provide acceptable results. Significantly, however, the invention is not limited in this regard and it may also be used with other metal powders, including other magnetically soft alloys such as Fe-6.5Si, or structural metals such as alloy 909 (Ni-42Fe-13Co-4.7Nb-1.5Ti-0.4Si).

The inorganic bonding media 14 is an inorganic material comprised of a ceramic, glass, or glass-ceramic. Examples of such materials include ceramic powder of composition 5.48 wt. % $Y_2O_3$-balance $ZrO_2$ (Grade TZ-3YS, which is commercially available from Toyo Soda Manufacturing Co. Ltd., Japan). This ceramic powder is known generically as yttria-partially stabilized zirconia or "Y-PSZ". However, other inorganic bonding media consisting of glass, ceramic or glass-ceramic materials may also be used for this purpose. For example, glass-ceramics have several attributes that make them very useful with regard to fabrication of inorganic-bonded composites under this invention. Compared with ceramics, glass-ceramics (when in the glassy state) will flow and more easily attain intimate contact with the metal particles of the composite. Compared with glasses, glass-ceramics generally have superior mechanical properties and have better corrosion resistance because they are at least partly crystalline. Glass-ceramics have another property that makes them particularly useful for use as the bonding media 14 for the metal particles 12. With proper control of crystallization, glass-ceramics can be made with a much wider range of coefficients of thermal expansion than can be achieved with glasses or conventional ceramics.

A particularly interesting group of glass-ceramics are those comprised of $Li_2O$, $Al_2O_3$, and $SiO_2$. Depending on specific composition, and crystallization species and amount, these materials can have coefficients of thermal expansion ranging from near zero to about $16\times10^{-6}/°$ C. It has been shown that under proper conditions (which may include oxidizing the surface of the metal) these wet and strongly bond to metals including Fe—Co—V alloys, stainless steels, Inconel 718, and Hastelloy C276. They are also known to develop high strength after crystallization.

The process for manufacturing the composite in FIG. 1 shall now be described. The composite 10 is formed by a series of steps beginning with coating the metal particles 12 with a thin layer of inorganic bonding media 14 in the form of a ceramic, glass, or glass-ceramic (or a mixture of two or more of the three materials) using any suitable process. In a preferred embodiment, a magnetically-assisted impaction coating method as practiced by Aveka, Inc. of Woodbury, Minn. was used to coat the magnetic alloy powder. However, alternative coating methods, such as chemical vapor deposition or physical vapor deposition may also be used, and the invention is not intended to be limited in this regard. The bonding media 14 preferably coats substantially the entire outer surface of the metal particles 12. A coating consisting of approximately 5%–10% by volume of bonding agent has been found to provide satisfactory results. However, smaller or larger amounts of bonding media may be used, depending on such factors as the particle size of the metal powder and the desired magnetic and/or mechanical properties of the composite body. For example, in the case of a composite intended for magnetic applications, it is generally desirable that the minimum amount of inorganic media be used in order to maximize the so-called "solidity" of the core. It is also desirable that a high percentage of the metal particles be electrically isolated from one another, in order to minimize the generation of eddy-current losses in the core. However, one skilled in the art will recognize that the surface area of the metal particles to be coated (and thus the volume fraction of inorganic media required) is directly dependent on the particle size of the metal particles. In other words, if for some reason (such as magnetic or mechanical requirements) a fine metal powder is used, the volume fraction of inorganic media will, of necessity, be higher since the specific surface area to be coated will also be higher. Alternatively, such as in the case of a non-magnetic composite, it may be desirable to increase the volume fraction of inorganic material in order to enhance the corrosion resistance of the composite.

Figure 2:
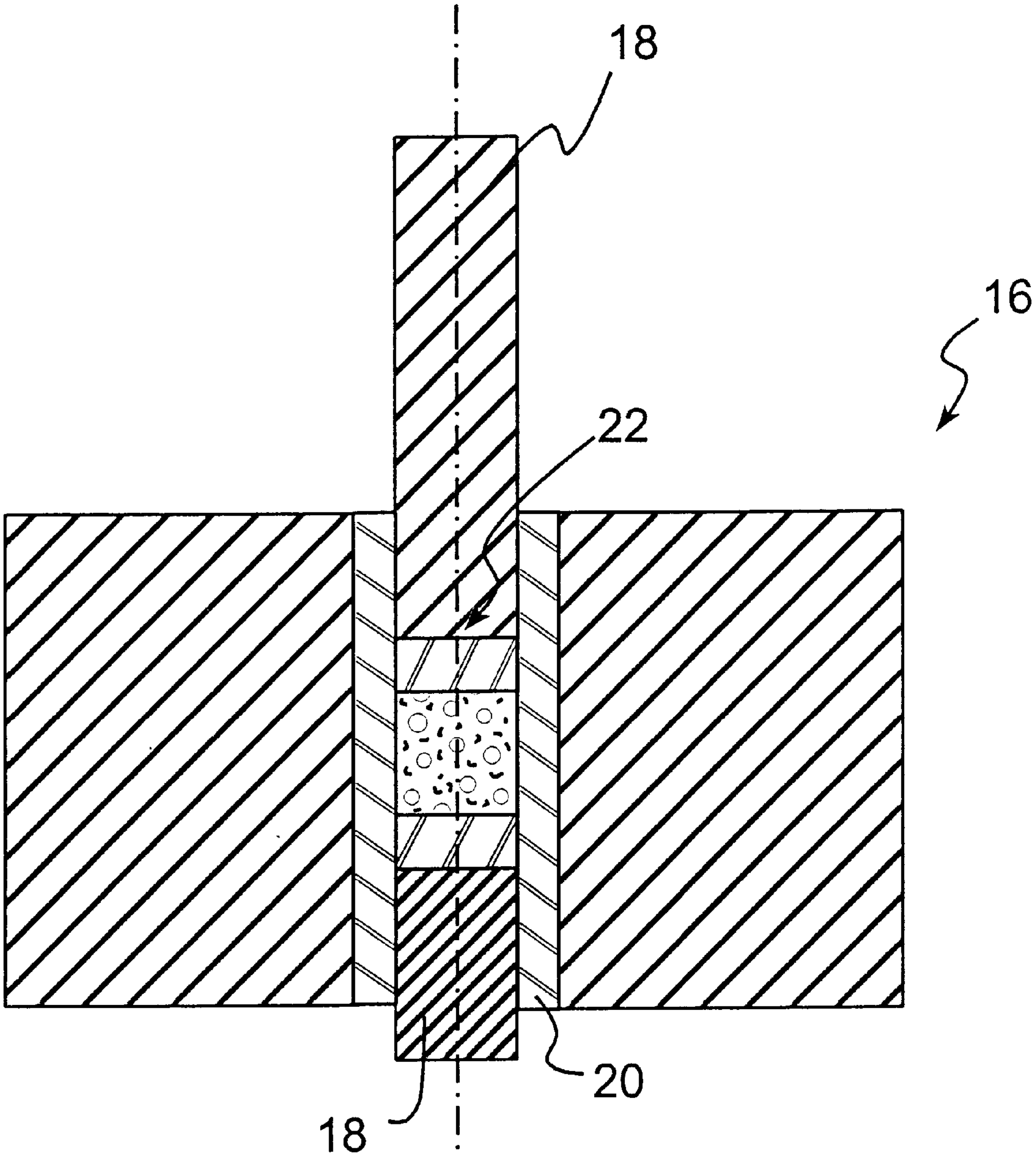
FIG. 2 is a cross-sectional view of a die in which a mass of ceramic-coated metal powder particles has been positioned prior to densification by uniaxial hot pressing.

Once the bonding media 14 has been applied as an outer layer, the metal particles 12 are processed to form a strong, densified composite structure 10. The densification process involves treatment of the coated metal particles with heat, with or without the application of pressure. If pressure is used to form the composite, it may be achieved by a mechanical process using a rigid die and known as uniaxial hot pressing, as illustrated in FIG. 2. As shown therein, a die 16 formed of graphite or some other suitable material is provided with a pair of compression pistons 18. The source of pressure to the pistons 18 is generally a hydraulic press with a water-cooled platen attached to the ram. If the die is formed of graphite, a sleeve 20 of a material such as boron nitride may be provided as shown in FIG. 2, to prevent a reaction between the particles 12 and the graphite during hot pressing. Similarly, a boron nitride disk 22 can be provided on the opposing ends of the compression pistons 18. FIG. 2 shows the arrangement of the boron nitride components. Alternatively, a flexible die and hydrostatic gas pressure can be used for this purpose in a process known as hot isostatic pressing. The time, temperature, and pressure parameters for either process are selected based on the values required to achieve densification of the inorganic bonding media 14 and the metal particles 12, and to bring about a chemical reaction (and therefore form a strong bond) between the two. Thus, it will be obvious to those skilled in the art, that the bonding parameters will be expected to vary according to the size, shape, specific compositions, and other properties of the materials that make up the composite article as well as other factors such as fixturing, furnace design, and furnace load.

In an alternate form of the process of the invention, the composite 10 is densified and bonded together at elevated temperature, but without the application of pressure at temperature. This is analogous to the widely used pressure-less sintering process for densification of powder bodies but, in this case, the sintered outer layer of bonding media 14 also reacts with and bonds to the metal particles 12.

In preparation for pressure-less sintering, the metal particles 12 which have been coated with ceramic, glass, or glass-ceramic material 14, are assembled in a closed cavity and compacted by uniaxial cold pressing. The cavity is preferably provided in the form of a die formed of steel or some other suitable material. Depending on certain powder characteristics such as particle size and particle size distribution, one or more additives may be mixed with the coated metal particles prior to introduction into the die cavity. Two of the additives commonly required for pressing are a binder and a lubricant. The binder provides some lubrication during pressing, and gives the pressed part adequate strength for further processing, such as inspection or green machining. The lubricant reduces interparticle friction and die-wall friction. The combined effects of the additives are: (1) to allow the particles to slide past each other to rearrange in the closest possible packing, and (2) to minimize friction so that all regions of the compact receive equivalent pressure. Typical binders include ethyl- or methyl-cellulose or polyethylene glycol (PEG), while stearic acid is widely used as a lubricant. However, those skilled in the art will recognize that there are many other materials used as binders and lubricants and the invention is not intended to be limited in this regard. After compaction, the composite 10 is placed into a furnace (with appropriate atmosphere) and heated to temperatures sufficient to sinter the inorganic bonding media 14 to itself and bring about reaction and bonding of the inorganic media 14 to the metal particles 12. It will be obvious to those skilled in the art that the specific conditions for pressure-less sintering of the composite, such as furnace atmosphere and thermal cycle will be expected to vary according to the size, shape, specific compositions, and other properties of the materials that make up the particles and materials forming the composite article, as well as other factors such as fixturing and furnace design and load.

The compositions and processes described in the following examples are intended to be illustrative of the invention and not in any way a limitation on the scope of the invention. Persons of ordinary skill in the art should be able to envision variations on the general principles of the invention that fall within the scope of the generic claims that follow.

EXAMPLE 1

The particles of a 100 gram batch of −325 mesh Hiperco 50A powder were coated with a thin layer (approximately 10% by weight) of Y-PSZ powder using a magnetically-assisted impaction coating method as practiced by Aveka, Inc. of Woodbury, Minn. The composition of the Hiperco 50A powder was 48.7Co-1.9V-balance Fe (weight percent). The Y-PSZ powder was grade TZ-2Y as supplied by Tosoh Corp., Tokyo, Japan. The ceramic powder had composition of 3.74 $Y_2O_3$-balance $ZrO_2$ (weight percent), and was in the form of ~1 micrometer diameter agglomerates made up of 260 angstrom diameter crystallites. A small portion of the so coated Hiperco 50A particles was placed in a boron nitride lined graphite die (FIG. 2) for densification into a thin, 28.6-mm-diameter disk by uniaxial hot pressing. Hot pressing was done in vacuum, with a 30 minute hold time at a temperature of 1200° C., and an applied stress of 34.5 MPa (5 ksi).

Figure 3:
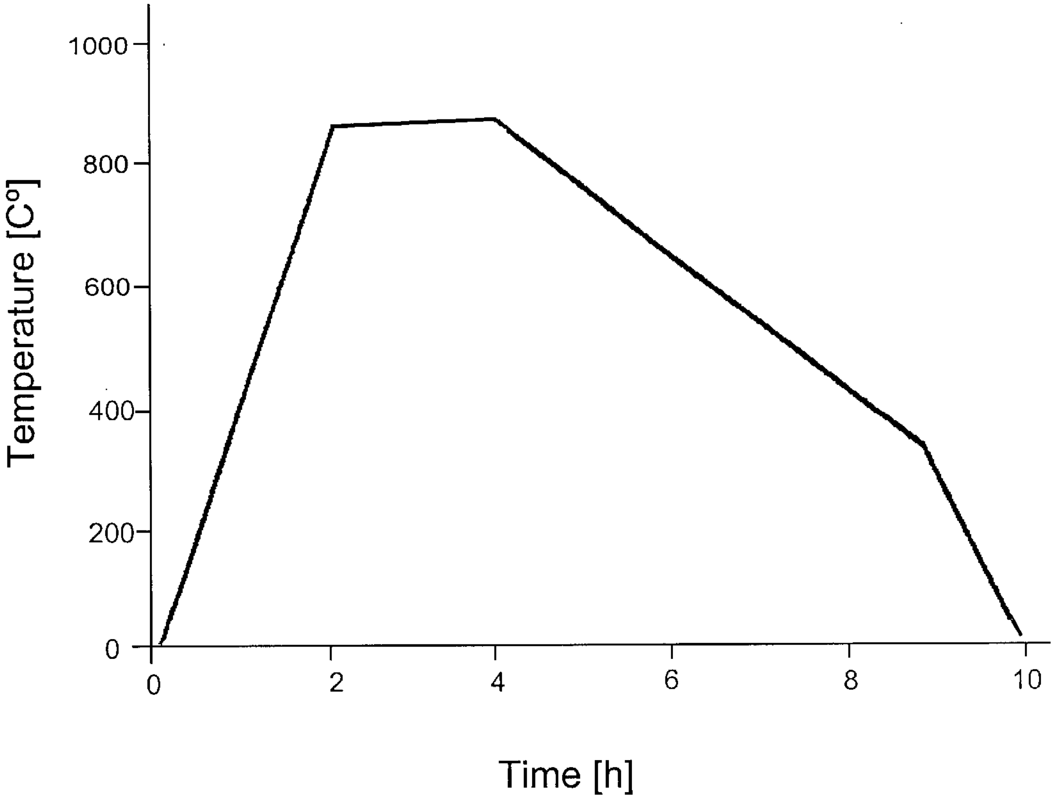
FIG. 3 is a graph showing a heat treatment cycle used for optimizing the magnetic properties of the composite.
Figure 4:
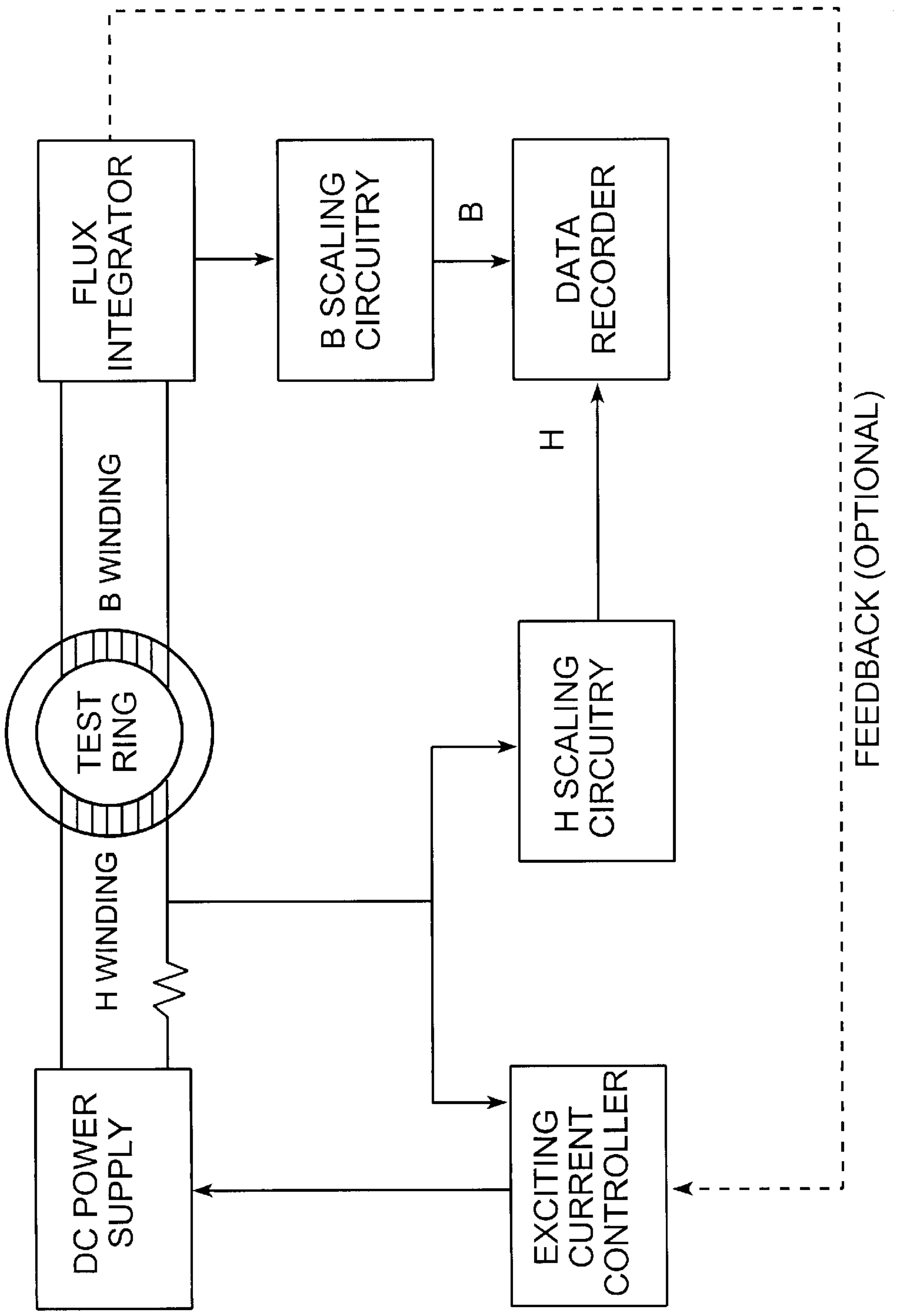
FIG. 4 is a block diagram of the ring test apparatus used for measuring DC magnetic properties of the composite according to the invention.
Figure 5:
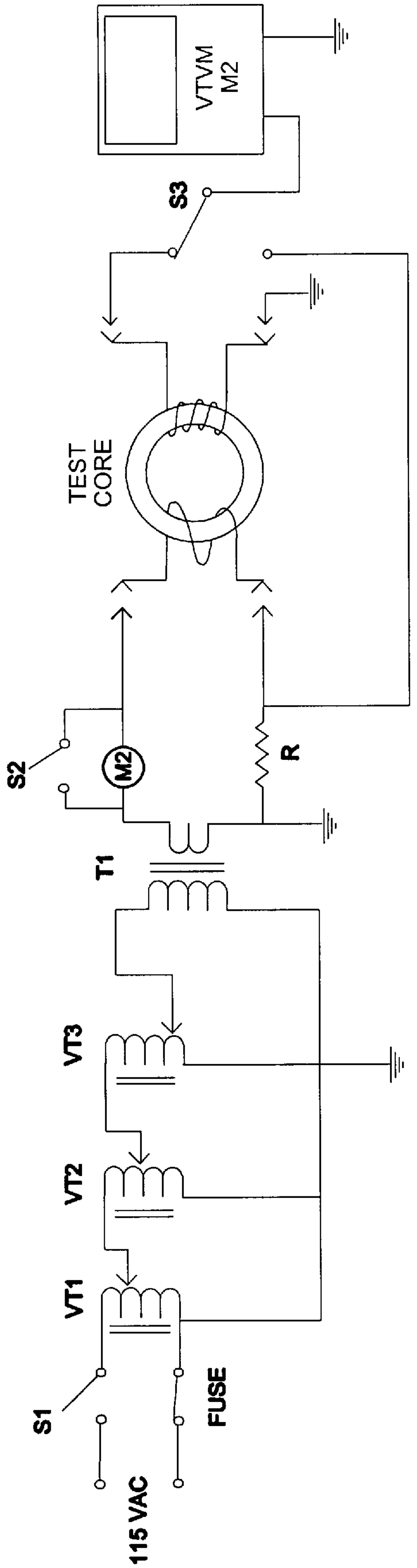
FIG. 5 is a schematic of the apparatus used for measuring AC magnetic properties of the composite according to the invention.

The hot pressed composite disk was machined into a 2.54-mm-thick ring having 2.03 cm inner diameter and 2.54 cm outer diameter. The ring was heat treated in vacuum, following the thermal cycle in FIG. 3, in order to optimize magnetic properties. DC magnetic properties were measured using the test setup illustrated in FIG. 4. AC magnetic properties were measured using the test setup in FIG. 5, wherein T1 is an isolation, current-type step down transformer; VT1, VT2 and VT3 are autotransformers; M1 is an ammeter, demagnetizing current (0–5 A); S3 is a DPDT switch; R is a noninductive precision resistor; and M2 is a high impedance digital voltmeter. The test circuit in FIG. 5 is excited by a 115 VAC drive voltage.

Driving and sensing windings were about 75 and 50 turns, respectively. A maximum drive field of 220 Oe was employed to saturate the material. Permeability, $\mu$, was determined by the initial curve. AC core loss was measured at a frequency of 400 Hz with peak induction of 9 kilogauss. The results are summarized below:

| DC Test | | | |
|---|---|---|---|
| Hc (Oe) | Bs (G) | $\mu$ Init. | $\mu$ Max. |
| 4.14 | $1.093 \times 10^4$ | 198 | 250 |

| AC Test | | |
|---|---|---|
| Peak ind (kG) | Freq (Hz) | Core loss (W/kg) |
| 9.01 | 400 | 262 |

EXAMPLE 2

The particles of an 8 kg batch of −325 mesh Hiperco 50A powder were coated with a thin layer (approximately 10% by weight) of Y-PSZ ceramic powder using a magnetically-assisted impaction coating method as practiced by Aveka, Inc. of Woodbury, Minn. The composition of the Hiperco 50A powder was 49.0Co-2.1V-balance Fe (weight percent). The Y-PSZ powder was grade TZ-3YS as supplied by Tosoh Corp., Tokyo, Japan. The ceramic powder had composition of 5.48 $Y_2O_3$-balance $ZrO_2$ (weight percent), and was in the form of 394-angstrom-diameter (0.04 micrometer) crystallites. The coated powder was placed in a thin-walled carbon steel canister that was seal welded, and evacuated in preparation for hot isostatic pressing. The canister was hot isostatically pressed at 1150° C. for 30 minutes under a gas pressure of 103 MPa (15 ksi).

The hot isostatically pressed billet was machined into a small ring and a large ring for magnetic testing as well as a number of small, button-head tensile specimens. The small ring was 2.54-mm-thick, with 2.03 cm inner diameter and 2.54 cm outer diameter. The large ring was 2.8 cm in height, with inner and outer diameters of 12.7 cm and 14.7 cm, respectively. The magnetic test rings and tensile specimens were heat treated in vacuum, following the thermal cycle in FIG. 3, in order to optimize magnetic properties. AC and DC magnetic properties were measured as described above with respect to Example 1. Drive and sense windings were about 75 and 50 turns, respectively for the small ring, and 500 and 20 turns for the large ring. A maximum drive field of 220 Oe was employed for both rings. Permeability, $\mu$, was determined by the initial curve. AC core loss was measured at a frequency of 400 Hz, with the peak inductions shown in the data summary that follows:

| | DC Test | | | |
|---|---|---|---|---|
| | Hc (Oe) | Bs (G) | $\mu$ Init. | $\mu$ Max. |
| Small ring | 3.28 | $1.848 \times 10^4$ | 2,179 | 2,372 |
| Large ring | 4.26 | $1.865 \times 10^4$ | 1,263 | 1,627 |

| | AC Test | | |
|---|---|---|---|
| | Peak ind (kG) | Freq (Hz) | Core loss (W/kg) |
| Small ring | 18 | 400 | 1,126 |
| Small ring | 9.2 | 400 | 144 |
| Large ring | 3.0 | 400 | 73 |

The strength of the hot isostatically pressed composite material was determined in a series of tensile tests conducted in air at room temperature, −50° C., and +100° C., at a cross-head speed of 0.02 in. per minute. These data showed that the strength of the composite material of this invention compares favorably to the yield strength of Hiperco 50A strip in the annealed condition. For example, the Carpenter Technology data sheets give a room temperature yield strength of 365 MPa (53 ksi) for annealed strip, whereas we measured an average strength of 441±19 MPa (64±3 ksi) in the composite material.

As one would expect in a material with ceramic surrounding each particle, the material is not ductile, with elastic strain levels less than 0.2 %. However, the elastic modulus of the material was found to be high.

EXAMPLE 3

Four small batches of Hiperco 50A powder were coated with $ZrO_2$ by magnetron sputtering using a zirconium metal target. For these experiments, sputtering was done by the compound-coated cathode mode, i.e., sufficient reactive gas (oxygen in this case) was continuously bled into the chamber during sputtering to form the desired compound ($ZrO_2$) on the target surface. This compound was then sputtered off and deposited on the substrate. All runs were conducted at a power of 150 watts in an Ar-10% $O_2$ atmosphere and a pressure of 20 millitorr. Movement of the Hiperco powder below the magnetron gun was provided by a vibrating apparatus (such as used to polish specimens for metallographic examination) on which was placed a small stainless steel pan. The degree of vibration of the powder and the sputtering time were the two variables of the study. Examination of the coated particles, by scanning electron microscopy, showed that the coating appeared dense and adherent, but that there were portions of most particles that were not completely covered. These experiments demonstrated the feasibility of coating the metal particles by magnetron sputtering, but also showed that further experimentation would be required in order to develop a procedure that would ensure that a very high percentage of the particles were completely coated.

EXAMPLE 4

A glass-ceramic has potential as an alternate material with which to insulate and bond together alloy powders into a magnetic core. Glass-ceramics are polycrystalline materials formed by controlled crystallization of special glasses. Glass-ceramics combine the ease and flexibility of forming of glass with the physical and mechanical properties of a ceramic. The properties of the glass-ceramic are determined by glass composition, glass-ceramic phase assemblage, and nature of the crystalline microstructure. The composition of the glass controls factors such as glass viscosity, and nucleation and crystallization behavior. The glass-ceramic phase assemblage (types of crystals and proportion of crystals to glass) are responsible for physical properties such as coefficient of thermal expansion. Finally, the nature of the crystalline microstructure (crystal size and morphology and spatial relationship between the crystals and glass) control the strength and fracture toughness of the material. The particular mix of crystalline species obtained in a glass-ceramic family depends on both composition and heat treatment. Thus, glass-ceramics can be tailored for compatibility (such as with regard to wetting or thermal expansion behavior) to a particular metal alloy, and can be made strong and tough; and, therefore, have great potential for this application.

A series of sessile drop wettability tests were conducted on samples of Hiperco 50A foil to determine what glass-ceramic compositions would wet this material and under what conditions. Hiperco foil was used in these preliminary experiments instead of the powder since it is much easier to determine wetting behavior on a foil substrate. A series of modified lithium aluminum silicate glasses were melted and ground into powder. We started with a $Li_2O$—$Al_2O_3$—$SiO_2$ (lithium aluminum silicate or LAS) glass-ceramic developed by Borom, Turkalo, and Doremus (J. Am. Ceram. Soc., 58 [9–10] 385–91 (1975), and then modified this composition to modify softening temperature and wetting behavior. The LAS material was chosen because, depending on specific composition and heat treatment, it reportedly can develop the same coefficient of thermal expansion as that of Hiperco 50A ($11\times10^{-6}$/° C.) and have 4-point flexural strengths up to 386 MPa (56 ksi). Based on the wettability tests, Hiperco 50A powder/LAS glass ceramic mixtures were poured into a boron nitride lined graphite die and densified by uniaxial hot pressing. The 28.6-mm-diam disks so produced were machined into rings (2.54-mm-thick, with 2.03 cm inner diameter and 2.54 cm outer diameter) for magnetic testing or into bars for flexural strength measurements. Although we were unable in this limited amount of developmental work to achieve the full magnitude of magnetic test values possible with the Hiperco 50A alloy, the results were encouraging and indicated that a glass-ceramic is a viable material with which to insulate and bond together alloy powders into a magnetic core. For example, a specimen comprised of 2 wt. % LAS glass powder of composition, by weight: 71.8 $SiO_2$, 12.6 $Li_2O$, 5.1 $Al_2O_3$, 4.8 $K_2O$, 3.2 $B_2O_3$, and 2.5 $P_2O_5$) and the balance Hiperco 50A powder (−200/+325 mesh) was hot pressed in vacuum for 60 minutes at 1100° C. under an applied stress of 20.7 MPa (3 ksi). Note that the alloy powder was not pretreated in this case.

AC and DC magnetic properties were measured as described above in Example 1. Drive and sense windings were about 75 and 50 turns, respectively. A maximum drive field of 220 Oe was employed to saturate the material. Permeability, $\mu$, was determined by the initial curve. AC core loss was measured at frequencies of 400 and 500 Hz with the peak inductions shown below:

| DC Test | | | |
|---|---|---|---|
| Hc (Oe) | Bs (G) | $\mu$ Init. | $\mu$ Max. |
| 2.49 | 1.993 x 104 | 1468 | 1500 |

| AC Test | | |
|---|---|---|
| Peak ind (kG) | Freq (Hz) | Core loss (W/kg) |
| 18.4 | 400 | 1067 |
| 5.22 | 400 | 34 |
| 5.23 | 500 | 50 |

Another series of composite disks (identified in this study as G22) were fabricated from 8% by weight of a LAS glass powder of composition, by weight (73.5 $SiO_2$, 12.9 $Li_2O$, 5.2 $Al_2O_3$, 5.0 $K_2O$, and 3.3 $B_2O_3$) with the balance Hiperco 50A powder (−325 mesh). Hot pressing was done in vacuum, with a 5 hour hold at 900° C. under an applied stress of 20.7 MPa (3 ksi). Magnetic tests were performed as before, with the results summarized below:

| DC Test | | | |
|---|---|---|---|
| Hc (Oe) | Bs (G) | $\mu$ Init. | $\mu$ Max. |
| 6.53 | $1.019 \times 10^4$ | 142 | 205 |

| AC Test | | |
|---|---|---|
| Peak ind (kG) | Freq (Hz) | Core loss (W/kg) |
| 9.08 | 400 | 338 |

One disk of this series was ground with a 220-grit diamond abrasive wheel to a thickness of about 3 mm. One surface of the disk was subsequently vibratory polished on a wire mesh cloth with 6-micrometer diamond slurry and sliced into bars having dimensions of about 3×3×20 mm. Groups of four flexure bars were tested at room temperature in 4-point bending, either as polished or after a three stage thermal treatment intended to nucleate and grow crystallites in the LAS glass. The flexural strength of the composite in the as-polished condition was 396± 32 MPa (57±5 ksi). The strength of the material after heat treatment was 471±35 MPa (68±5 ksi).

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A composite structure comprised of:

a plurality of non-oxidized. Fe—Co—V alloy particles, each of said particles substantially coated with a layer of inorganic bonding media selected from at least one of the group consisting of a ceramic, glass, and glass-ceramic material;

said layer of inorganic bonding media formed on each particle being bonded with the particle and with the layer of inorganic bonding media on adjacent particles to form a cohesive composite structure.

2. The composite structure of claim 1 wherein said metal particles are comprised of a magnetic alloy.

3. The composite structure of claim 1 wherein said metal particles are comprised of a non-magnetic alloy.

4. A composite structure comprised of:

a plurality of metal particles, each of said metal particles substantially coated with a layer of inorganic bonding media selected from at least one of the group consisting of a glass and glass-ceramic material;

said layer of inorganic bonding media formed on each particle being bonded with the particle and with the layer of inorganic bonding media on adjacent particles to form a strong and cohesive composite structure.

* * * * *